Patented Oct. 29, 1929

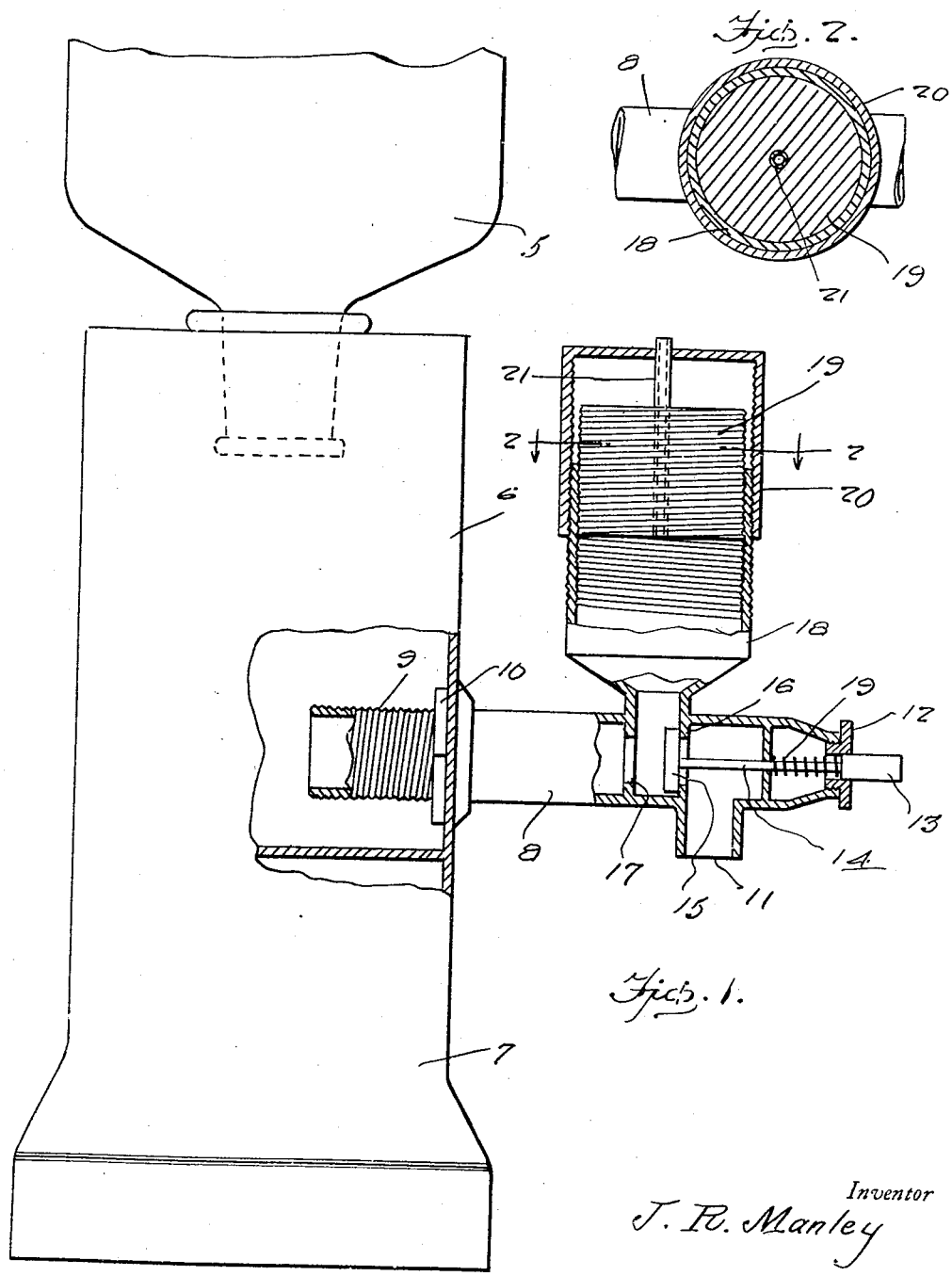

1,733,310

UNITED STATES PATENT OFFICE

JOB RIGBY MANLEY, OF EAST LIVERPOOL, OHIO, ASSIGNOR OF ONE-HALF TO WILLIAM THOMAS McGREW, OF EAST LIVERPOOL, OHIO

LIQUID DISPENSER

Application filed June 15, 1928. Serial No. 285,725.

This invention relates to an improved liquid dispenser which is especially but not necessarily adapted for soda fountain use, where it is desirable to measure the amount of liquid dispensed.

The invention has more particular reference to a novel measuring valve for dispensing devices of the type specified.

In carrying out the invention, I have endeavored to produce a structure which is positive and dependable in action, smooth and quiet in operation, accurate and otherwise efficient in performance and capable of fulfilling the requirements of a structure of this class in a satisfactory manner.

In the drawings:

Figure 1 is a side view of a portion shown in section and elevation representing a dispensing device equipped with a measuring valve of one form.

Figure 2 is a horizontal section on the line 2—2 of Figure 1.

In the drawings, the reference numeral 5 designates a bottle having its jug neck fitting down into the filler opening of a liquid container 6, supported on a suitable base 7.

The measuring valve in Figure 1, comprises an elongated cylindrical casing 8 having a screw threaded nipple 9 on its inner end carrying a retaining nut 10. Formed on the under side and adjacent the outer end is a discharge nozzle 11, and fitted in the outer end is a plug 12, constituting a mounting for the finger piece 13 of the plunger valve element. This pluger valve element comprises a stem 14 having a disc like head 15 on its inner end cooperable with a centrally apertured partition 16, inside of the casing 8. Also in the casing is a similar partition 17 for delivering fluid through the casing 8 and into the feeding and measuring cup 18. The valve 15 is normally closed in position against the partition 16 by the coiled spring 19, thus preventing the escape of the liquid from the cup 18. The cup 18 is internally and externally screw threaded. Threaded into the cup is a measuring plug 19; threaded on the outside of the cup is a covering cap 20. The numeral 21 merely designates a vent. By taking off the cap 20, the plug 19 may be regulated to measure the amount of liquid flowing into the cup 18. Under normal conditions, the liquid feeds out of the bottle 5 into the container 6 and from the container 6 through the casing 8 into the cup 18, inasmuch as the partition opening in 17 is normally uncovered. By forcing inwardly on the plunger valve, the opening through 17 is covered and communication is established between the cup 18 and discharge nozzle 11 through the opening in partition 16.

The quantity of liquid is then allowed to flow into a glass or other receptacle placed beneath the nozzle.

It is thought that by considering the description in connection with the drawing, a clear understanding of the invention will be had. Therefore a more lengthy description is regarded unnecessary.

Minor changes in the shape, size, and rearrangement of parts coming within the field of invention claimed, may be resorted to, if desired.

I claim:

A measuring valve for a liquid dispenser of the class described comprising an elongated hollow casing provided with means at its inner end for attachment to a liquid container and provided at its outer end with a discharge nozzle, and provided on its interior with spaced apertured partitions, a cup on the casing disposed for cooperation with said partitions, regulating means in the cup, and a spring closed manually actuated plunger valve successively cooperable with the apertures in said partitions and mounted for reciprocatory motion in said casing.

In testimony whereof I affix my signature.

JOB RIGBY MANLEY.